United States Patent [19]
Namiki et al.

[11] Patent Number: 5,644,142
[45] Date of Patent: Jul. 1, 1997

[54] RADIATION IMAGE READING AND ERASING APPARATUS

[75] Inventors: Fumihiro Namiki; Shinichi Yoshimoto, both of Kawasaki, Japan

[73] Assignee: Fujitsu Limited, Kawaski, Japan

[21] Appl. No.: 490,578

[22] Filed: Jun. 15, 1995

[30] Foreign Application Priority Data

Nov. 29, 1994 [JP] Japan .................................. 6-295014

[51] Int. Cl.[6] .................................................. G01N 23/04
[52] U.S. Cl. ........................... 250/586; 250/584; 250/588
[58] Field of Search .................................. 250/584–586, 250/588

[56] References Cited

FOREIGN PATENT DOCUMENTS 6-14233  11/1983  Japan .
124938   6/1986   Japan .................................. 250/588

Primary Examiner—Carolyn E. Fields
Attorney, Agent, or Firm—Staas & Halsey

[57] ABSTRACT

A radiation image reading and erasing apparatus for deriving image signals in such a manner that an accelerated phosphorescence fluorescent material object, onto which radiation images are accumulated and stored, is scanned with an excitation light, and an accelerated phosphorescence fluorescent light, which is emitted from the accelerated phosphorescence fluorescent material object, is received. The apparatus is designed to obtain image data free of unwanted noises, and to occupy less space. The accelerated phosphorescence fluorescent material object is irradiated with a laser beam passing through a slit member to photomultipliers through reflection between sheets. The slit member may move with up-and-down motions. The sheets are taken-up or sent out by or from the associated take-up rollers, respectively, in accordance with the movement of slit member. The apparatus also has an erasing unit with a movable reflector to erase image information from the accelerated phosphorescence fluorescent material object.

5 Claims, 19 Drawing Sheets

FIG. I

RADIATION IMAGE READING AND ERASING APPARATUS

BACKGROUND OF THE INVENTION

1. Field of the Invention

The present invention relates to a radiation image reading apparatus for deriving image signals in such a manner that a slab-like shaped accelerated phosphorescence fluorescent material object, on which radiation images are accumulated and stored, is scanned with excitation light, and an accelerated phosphorescence fluorescent light, which is emitted from the accelerated phosphorescence fluorescent material object, is received.

2. Description of the Related Art

Radiation images such as x-ray images have been often used for a medical diagnosis. For example, in case of x-ray images, an x-ray transmitted through a subject is applied to a fluorescent material layer (fluorescent screen) so as to be converted into a visible light. The visible light is applied to a silver halide film to form a latent image. The x-ray image is obtained by developing this silver halide film. The x-ray images thus obtained are used for medical diagnosis. Recently, there has been adopted a system for obtaining a high quality of reproduced image wherein the x-ray image formed on a silver halide film as described above is read photoelectrically by a so-called film digitizer to derive image signals and these image signals are subjected to an image processing to improve various image characteristics which determine the image qualities, such as definition, dynamic range, graininess and the like.

Instead of the above-described system using silver halide films, a system using an accumulative fluorescent material (accelerated phosphorescence fluorescent material) has begun to be used. The system using the accelerated phosphorescence fluorescent material is a system in which the accelerated phosphorescence fluorescent material in a shape of sheet or panel is irradiated with an x-ray transmitted through the subject so that x-ray images are accumulated and stored in the accelerated phosphorescence fluorescent material, then the accelerated phosphorescence fluorescent material is scanned with an excitation light to emit an accelerated phosphorescence fluorescent light carrying the x-ray images stored therein, and the accelerated phosphorescence fluorescent light is photoelectrically read to derive image signals and the image signals thus derived are subjected to an image processing to obtain reproduced images. The basic method of this system is disclosed in U.S. Pat. No. 3,859,527. Here, the term "accelerated phosphorescence fluorescent material" refers to a fluorescent material which accumulates therein part of energy of radiation for a while or a long period of time when it is irradiated with radiation such as X-rays, α-rays, β-rays, γ-rays or the like, and emits the accumulated energy as an accelerated phosphorescence fluorescent light when it is irradiated with an excitation light such as infrared radiation, visible light, ultraviolet radiation or the like during such an accumulation. In this case, a type of radiation the energy of which is prone to be accumulated, a wavelength of an excitation light which facilitates the emission of an accelerated phosphorescence fluorescent light and a wavelength of an accelerated phosphorescence fluorescent light to be emitted differ depending on the type of a fluorescent material to be used.

According to a system using such an accelerated phosphorescence fluorescent material, it is recognized that an energy of radiation applied to the accelerated phosphorescence fluorescent material is proportional to a light quantity of the accelerated phosphorescence fluorescent light emitted by irradiation of the excitation light over the wide range of energy and the ratio of proportion can be changed in accordance with the light quantity of the excitation light. Thus, it is possible to obtain a radiation image which will not be affected by variations of exposure of radiation. In case of a system in which X-ray images of a human body is obtained, it is possible to reduce the exposure on the human body in the X-ray radiography.

A system using the accelerated phosphorescence fluorescent material as mentioned above involves the following four steps throughout the radiography of X-ray images. First, X-ray image information of a subject is accumulated and stored in the accelerated phosphorescence fluorescent material. This step is referred to as "storage". Next, the accelerated phosphorescence fluorescent material, which is subjected to the "storage" process, is scanned with the excitation light such as a laser beam so as to emanate the accelerated phosphorescence fluorescent light. The accelerated phosphorescence fluorescent light is condensed and received with a photoelectric converter, thereby deriving an electric signal which is proportional to the intensity of the accumulated radiation. This step is referred to as "reading". Thereafter, the electric signal thus derived is subjected to an image processing in accordance with necessity and a visible radiation image is obtained by means of printing on a silver film or displaying on a CRT. This step is referred to as "display". Even after the "reading", the radiation energy still remains in the accelerated phosphorescence fluorescent material. The residual energy is removed in such a manner that after the reading the accelerated phosphorescence fluorescent material is irradiated with a relatively strong excitation beam to emanate the accelerated phosphorescence fluorescent light. This step is referred to as "erasing". In case of the radiography of a plurality of sheets of X-ray image, the above-mentioned four steps or three steps of "storage", "reading" and "erasing" are repeated but with "display" in the final step.

FIG. 18 is an illustration showing the basic arrangement of constituents of a radiation image reading apparatus using an accelerated phosphorescence fluorescent material. FIG. 19 is a sectional view of a substage condenser which is used in the radiation image reading apparatus as shown in FIG. 18.

First, a slab-like shaped accelerated phosphorescence fluorescent material object 1, which is accommodated in a cover member (not illustrated) for the apparatus, is irradiated with x-rays emitted from an x-ray source 2 passing through a subject 3, so that an x-ray image of the subject 3 is accumulated and stored in the accelerated phosphorescence fluorescent material object 1. In reading, a laser beam source 4 emits a laser beam 4a as an excitation beam. The emitted laser beam 4a is reflected by a mirror 5 and then deflected by a polygonal mirror 6. Thereafter, the deflected beam is corrected by an f-θ lens 7 so that a laser spot runs straight in uniform motion on the accelerated phosphorescence fluorescent material object 1, and then applied via a first aperture 8a and a second aperture 8b of a substage condenser 8 to the accelerated phosphorescence fluorescent material object 1. The accelerated phosphorescence fluorescent material object 1 is scanned with the beam thus generated in a main scanning direction. An accelerated phosphorescence fluorescent light, which is emanated through scanning once in the main scanning direction with the laser beam 4a (excitation beam), is incident upon the substage condenser 8 through the second aperture 8b thereof. The substage condenser 8 is provided with a cavity 8c inside thereof. The accelerated phosphorescence fluorescent light incident upon the substage condenser 8 through the second aperture 8b travels in the cavity 8c toward a photomultiplier 9, while repeating the reflection from the inner wall of the cavity 8c.

Between the substage condenser 8 and the photomultiplier 9, there is provided an optical filter (not illustrated) which inhibits light having a wavelength of the excitation laser beam from being transmitted and permits only the accelerated phosphorescence fluorescent light to be transmitted. The accelerated phosphorescence fluorescent light selectively derived through such an optical filter is converted into an electric signal by the photomultiplier 9, and the electric signal thus obtained is amplified in signal level by an amplifier 10 to a level which is optimum for an A/D conversion. The electric signal thus amplified is converted into a digital signal by an A/D converter 11 so as to derive a line of time-sequence data as to an image corresponding to one scanning by the excitation beam (laser beam).

A single unit, which is referred to as a reading unit, is constituted of: a scanning system comprising the laser beam source 4, the mirror 5, the polygonal mirror 6, the f-θ lens 7 and the like; a light receiving system comprising the substage condenser 8, the photomultiplier 9 and the like; and an erasing light source 12 for emanating an erasing light. The reading unit is arranged to be freely movable in both the directions of arrows X and Y as shown in FIG. 18. In reading, first, the reading unit is located at the topmost position in the direction of arrow Y, and then the above-mentioned main scanning is repeated while the reading unit is moved (sub-scanning) in the direction of arrow X. In this manner, the image accumulated and stored in the accelerated phosphorescence fluorescent material object 1 is read in its entirety and be converted into image data.

When the reading unit reaches the lowest position in the direction of arrow X through the reading mentioned above, the laser beam source 4 turns off, whereas the erasing light source 12 turns on and the reading unit moves in the direction of arrow Y. During a movement of the reading unit, the erasing light emanated from the erasing light source 12 is applied to the accelerated phosphorescence fluorescent material object 1 so that the energy (residual image) remaining in the accelerated phosphorescence fluorescent material object 1 is erased.

FIGS. 20 and 21 are each a view showing by way of example a substage condenser which is different in type from the substage condenser 8 shown in FIG. 19.

Hitherto, as a substage condenser for guiding the accelerated phosphorescence fluorescent light into a photoelectric converter, there are further known, in type other than that having the cavity shown in FIG. 19, a so-called bundle type of condenser in which a number of plastic fibers or glass fibers are bundled, as shown in FIG. 20, and a so-called light guide sheet type of condenser in which a plastic plate such as an acrylic sheet is bent. The substage condensers shown in FIGS. 20 and 21 have each a configuration adapted to guide the accelerated phosphorescence fluorescent light, which is emanated on the scanning line in straight, into a photoelectric converter having a circular photoelectric surface.

The radiation image reading apparatus mentioned above as the related art has been associated with the following drawbacks with respect to the reading.

It is known that vibrations of a photomultiplier involve the superposition of noises upon an electric signal outputted from the photomultiplier. A mechanical movement of the photomultiplier as shown in FIG. 18 involves such a problem that minute vibrations involved in the movement are transmitted to the photomultiplier whereby noises are superposed upon a reproduced image.

A traveling path for the reading unit forms a dead space which inhibits other parts from being disposed. Thus, for example, a power supply, a circuit substrate and the like, which are needed to be arranged in the apparatus, are obliged to be disposed in a place other than the dead space. This causes an apparatus of a larger size to be needed.

In order to prevent the superposition of noises due to vibrations of the photomultiplier, it is considered that the photoelectric converter is fixed, whereas the accelerated phosphorescence fluorescent material object is moved. However, since the accelerated phosphorescence fluorescent material object has a slab-like shaped wide area, it will be needed to provide a larger dead space which enables the accelerated phosphorescence fluorescent material object to be moved.

The radiation image reading apparatus mentioned above as the related art has been associated with the following drawbacks also with respect to the erasing.

In order to perform the erasing efficiently with a low electric power and in a short time, it is desired that a wavelength band of a relative spectral energy distribution of the erasing light source is within a wavelength band of an accelerated phosphorescence excitation spectrum, and in addition a lamp efficiency (luminous flux per unit dissipation power) of the erasing light source is high. By the way, when the accelerated phosphorescence fluorescent material object Ba Br$_2$:Eu is used for a latent image storage, the wavelength band of an accelerated phosphorescence excitation spectrum is approximately coincident with the visible light region, whereas the wavelength band of a relative spectral energy distribution of the tungsten halogen lamp used usually as the erasing light source overlaps with the visible light region but in major part spreads over the infrared region. In other words, an amount of energy for use in the erasing, among the energy supplied to the tungsten halogen lamp, is only a small amount converted as the visible light, and the remaining major part of the energy is emitted as heat.

When it is intended to perform the erasing in a short time, there is a need to apply the strong visible light to the accelerated phosphorescence fluorescent material object. Consequently, in order to obtain the strong visible light with the use of the tungsten halogen lamp having the characteristics as mentioned above, it is necessary to use a tungsten halogen lamp which is of very high dissipation power in the order of several kilo-watts, and disposes the lamp near the accelerated phosphorescence fluorescent material object and move it along the accelerated phosphorescence fluorescent material object.

A high dissipation power of tungsten halogen lamp emanates intense heat. This heat diffuses within a cover member of the radiation image reading apparatus to increase the temperature within the cover member of the apparatus. Increased temperature causes the accelerated phosphorescence fluorescent light emanated on the accelerated phosphorescence fluorescent material object to vary in level. This affects a signal level of the X-ray image. Further, this affects thermally various electric circuits which are incorporated in the cover member. This will cause a malfunction. In view of the foregoing, in order to prevent a thermal diffusion from the tungsten halogen lamp, generally, there is provided an ventilating arrangement for exchanging warm air surrounding the tungsten halogen lamp and cool air outside the cover member. Thus, a large occupation space is needed. This requires a large sized apparatus.

On the other hand, there is known a system in which an erasing light source is fixed and an accelerated phosphorescence fluorescent material object is irradiated with erasing light in its entirety all at once. However, according to this system, there is a need to provide an optical path from the erasing light source to the accelerated phosphorescence fluorescent material object. In other words, the optical path forms a dead space. This requires a large sized apparatus, since the units, which are to be incorporated in the cover member of the apparatus, cannot be disposed on the optical path and there is a need to install the units outside the optical path.

In view of the foregoing, it is an object of the present invention to provide a radiation image reading apparatus capable of obtaining image data while reducing noises.

It is another object of the present invention to provide a radiation image reading apparatus which contributes to miniaturization of the apparatus.

SUMMARY OF THE INVENTION

The first radiation image reading apparatus according to the present invention, which attains the above-mentioned object, basically comprises a scan unit for scanning a slab-like shaped accelerated phosphorescence fluorescent material object, on which image information is accumulated and stored, on a two-dimensional basis in such a manner that the accelerated phosphorescence fluorescent material object is repeatedly scanned with excitation light in a predetermined main scan direction along the accelerated phosphorescence fluorescent material object, while the excitation light is moved relative to the accelerated phosphorescence fluorescent material object in a sub-scan direction crossing with the main scan direction, and a light receiving unit for receiving an accelerated phosphorescence fluorescent light emanated from the accelerated phosphorescence fluorescent material object. In the first radiation image reading apparatus, the light receiving unit comprises:

(1-1) a slit member having a slit extending in the main scan direction for causing the excitation light to transmit toward the accelerated phosphorescence fluorescent material object, said slit member being movable along the accelerated phosphorescence fluorescent material object in the sub-scan direction;

(1-2) a photoelectric converter for receiving the accelerated phosphorescence fluorescent light, said photoelectric converter being fixed; and (1-3) a light guide member for guiding to said photoelectric converter the accelerated phosphorescence fluorescent light emanated from the accelerated phosphorescence fluorescent material object through irradiation of the accelerated phosphorescence fluorescent material object with the excitation light entered from said slit member, said light guide member being extending between said slit member and said photoelectric converter, and being elastic between said slit member and said photoelectric converter in accordance with a movement of said slit member in the sub-scan direction.

In the radiation image reading apparatus as mentioned above, it is preferable that said light guide member is a sheet spreading between said slit member and said photoelectric converter, and said light receiving unit is provided with a take-up roller for taking-up said sheet in accordance with a movement of said slit member in the sub-scan direction.

In this case, it is preferable that an outside of said sheet is formed on a reflection surface which reflects erasing light, and said apparatus further comprises:

(2_1) an erasing light source for emitting the erasing light to erase image information remained in said accelerated phosphorescence fluorescent material object, said erasing light source being fixed; and (2_2) a sheet moving mechanism for moving said sheet between a light receiving position to guide the accelerated phosphorescence fluorescent light to said photoelectric converter and an erasing position to reflect at the outside of said sheet the erasing light emanated from said erasing light source toward said accelerated phosphorescence fluorescent material object, in a state that the sheet is fed from said take-up roller.

Further, in the first radiation image reading apparatus as mentioned above, it is preferable that said scan unit comprises:

(3_1) an excitation light source for emitting excitation light, said excitation light source being fixed;

(3_2) a deflection optical system for repeatedly deflecting the excitation light emitted from said excitation light source so that the accelerated phosphorescence fluorescent material object is scanned with the excitation light in the main scan direction; and (3_3) an optical system adapted to control an optical path length for guiding the excitation light emitted from said excitation light source to said slit member keeping a constant length of an optical path between said excitation light source and the slit member in accordance with a movement of said slit member in the sub-scan direction.

The second radiation image reading apparatus according to the present invention, which attains the above-mentioned object, basically comprises a scan unit for scanning a slab-like shaped accelerated phosphorescence fluorescent material object, on which image information is accumulated and stored, on a two-dimensional basis in such a manner that the accelerated phosphorescence fluorescent material object is repeatedly scanned with excitation light in a predetermined main scan direction along the accelerated phosphorescence fluorescent material object, while the excitation light is moved relative to the accelerated phosphorescence fluorescent material object in a sub-scan direction a crossing with the main scan direction, light receiving unit for receiving an accelerated phosphorescence fluorescent light emanated from the accelerated phosphorescence fluorescent material object, and a erasing unit for irradiating the accelerated phosphorescence fluorescent material object with erasing light to erase image information remained in the accelerated phosphorescence fluorescent material object. In the second radiation image reading apparatus, said erasing unit comprises:

(4-1) an erasing light source for emitting the erasing light, said erasing light source being fixed; and (4_2) a reflection member movable between an erasing position to reflect the erasing light emanated from said erasing light source toward the accelerated phosphorescence fluorescent material object and a save position saved apart from the erasing position.

In the second radiation image reading apparatus as mentioned above, it is preferable that said reflection member is a reflection sheet, and said erasing unit is provided with a take-up roller for taking-up said reflection sheet at the save position.

Incidentally, it is noted that the term "movable" referred to above implies not only a movement of the reflection member keeping the shape when the erasing light is reflected, but also a change of the position of a reflection sheet, in a case where the reflection member is the reflection sheet, which change will be caused by a development or taking-up of the reflection sheet.

According to the first radiation image reading apparatus, the photoelectric converter for receiving the accelerated phosphorescence fluorescent light is fixed (Item (1_2)), and the apparatus comprises a slit member having a slit extending in the main scan direction for causing the excitation light to transmit toward the accelerated phosphorescence fluorescent material object, said slit member being movable along the accelerated phosphorescence fluorescent material object in the sub-scan direction ((Item (1_1)), and a light guide member for guiding to said photoelectric converter the accelerated phosphorescence fluorescent light emanated from the accelerated phosphorescence fluorescent material object, said light guide member being elastic between said slit member and said photoelectric converter (Item (1-3)). These features make it possible to prevent contamination of noises due to a movement and/or a vibration of the photoelectric converter, and also to contribute to miniaturization of the apparatus since there is no need to move, for the reading, the accelerated phosphorescence fluorescent material object.

Said light guide member is, for example, a sheet spreading between said slit member and said photoelectric converter, and said light receiving unit is provided with a take-up roller for taking-up said sheet. These features make it possible to efficiently transmit the accelerated phosphorescence fluorescent light to the photoelectric converter, and also to accommodate the sheet with a compactness through taking-up the sheet.

Further, according to the first radiation image reading apparatus, the erasing light source is fixed (Item (2_1)), and there is provided with the sheet moving mechanism as defined in Item (2_2). In this case, the sheet serves as a reflection mirror. Thus, even if the erasing light source is fixed, the narrow dead space permits the accelerated phosphorescence fluorescent material object to be irradiated with the erasing light, thereby contributing to further miniaturization of the apparatus.

Furthermore, according to the first radiation image reading apparatus, the excitation light source is fixed (Item (3_1)), and there is provided with the optical system adapted to control an optical path length, as defined in Item (3_3). This arrangement permits not only the excitation light source, but also almost of all optical components except for said optical system to control an optical path length, such as the mirror 5, the polygonal mirror 6, the fθ lens 7, and the like, as explained referring to FIG. 18, to be fixedly disposed. Thus, remarkably reduced dead space can be used comparing with a case that the scanning optical system is moved in its entirety, thereby contributing to further miniaturization of the apparatus.

According to the second radiation image reading apparatus, there is provided a reflection member movable (including taking-up and developing) between an erasing position to reflect the erasing light emanated from said erasing light source (Item (4_1) toward the accelerated phosphorescence fluorescent material object and a save position saved apart from the erasing position (Item (4_2)). This feature makes it possible to irradiate the accelerated phosphorescence fluorescent material object with the erasing light in the narrow dead space, thereby contributing to miniaturization of the apparatus.

In the second radiation image reading apparatus as mentioned above, if the apparatus is arranged in such a way that said reflection member is a reflection sheet, and said reflection member (reflection sheet) has been taken-up throughout the time other than that of the erasing, it is possible to reduce the size of the reflection member (reflection sheet), thereby miniaturizing the apparatus.

DESCRIPTION OF THE PREFERRED EMBODIMENTS

Hereinafter, there will be described embodiments of the present invention.

Figure 1:
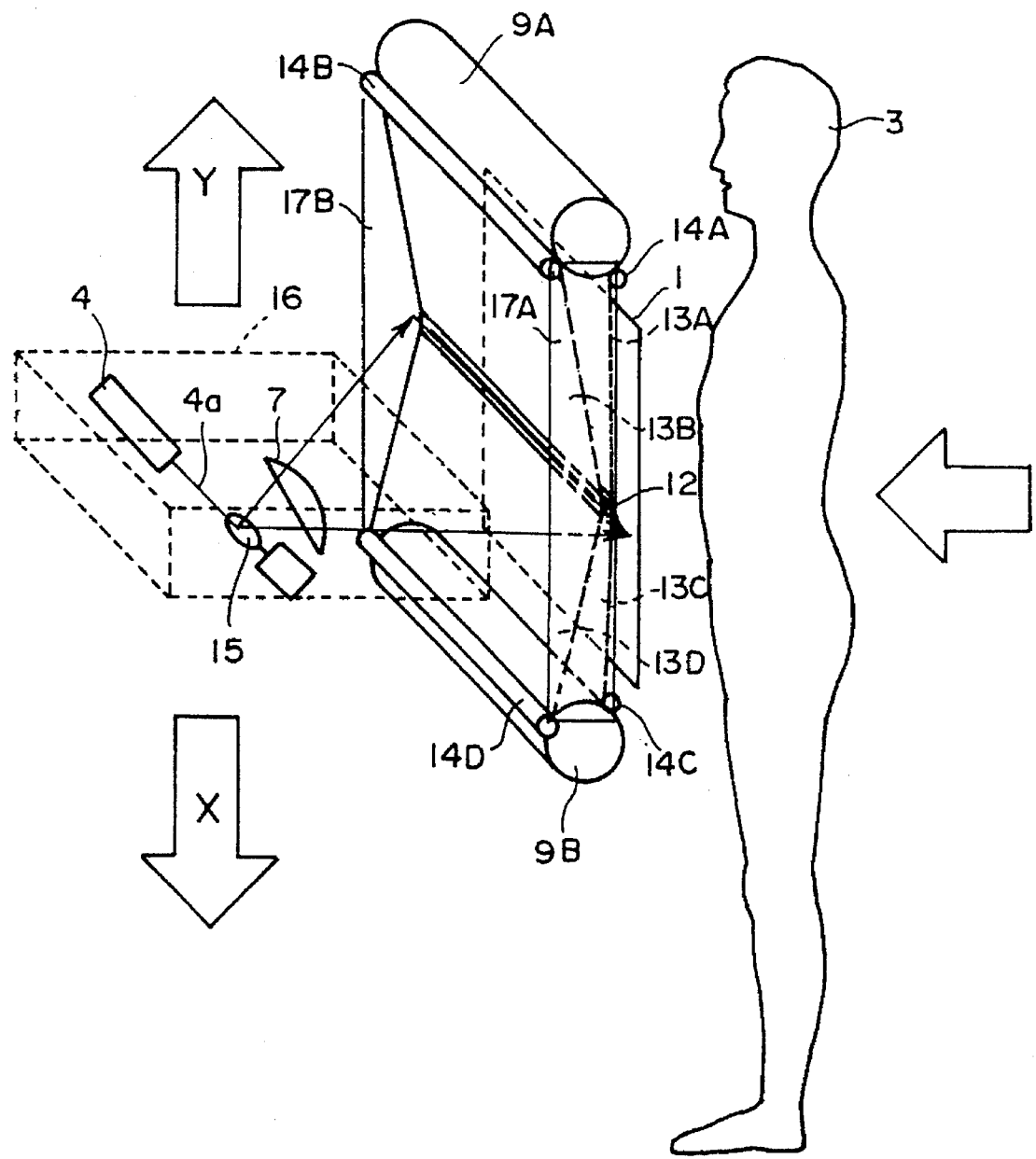
FIG. 1 is a typical schematic diagram showing an embodiment of the first radiation image reading apparatus according to the present invention.
Figure 2:
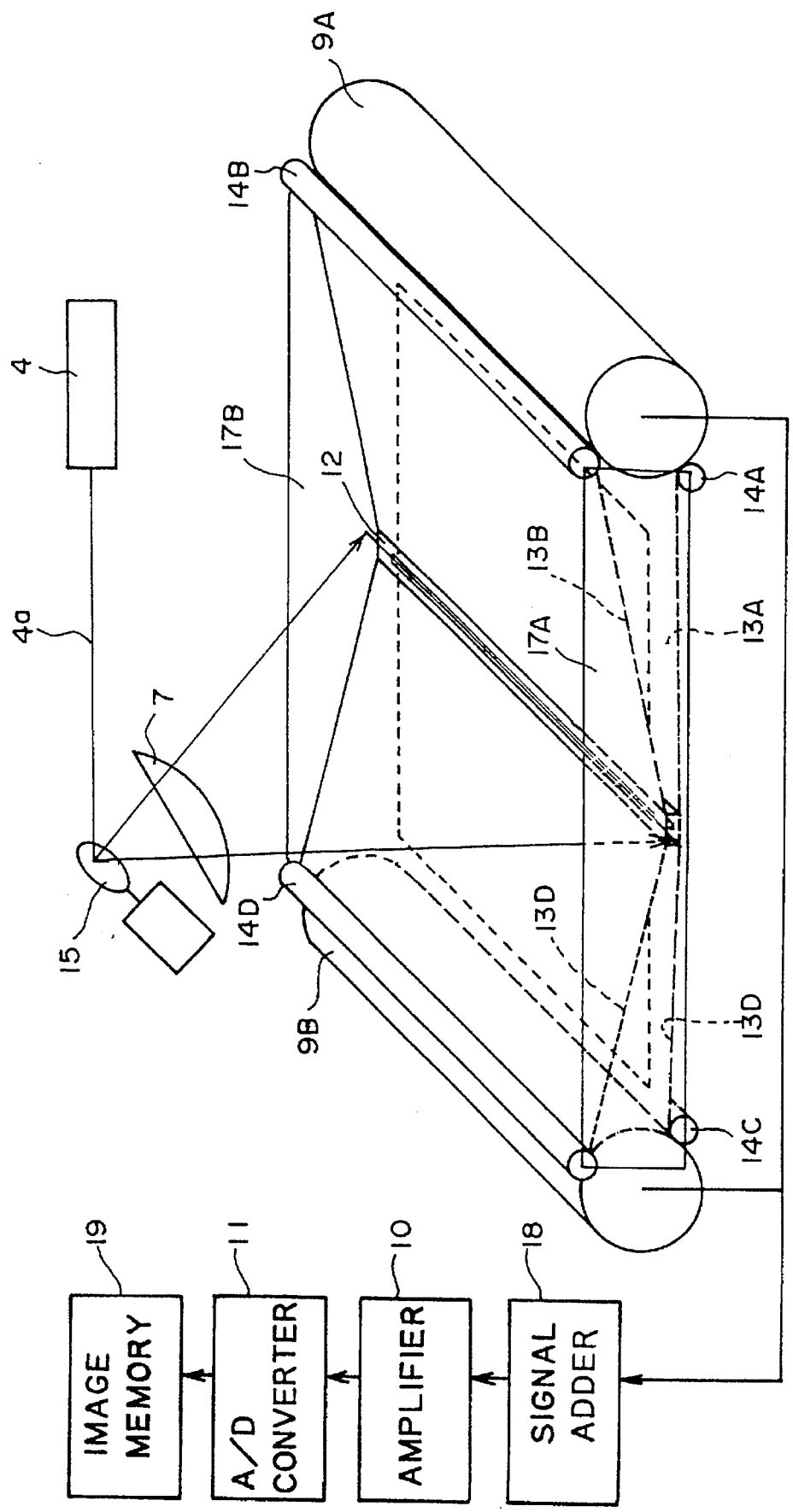
FIG. 2 is an enlarged view of aspect portions of the embodiment shown in FIG. 1.
Figure 3:
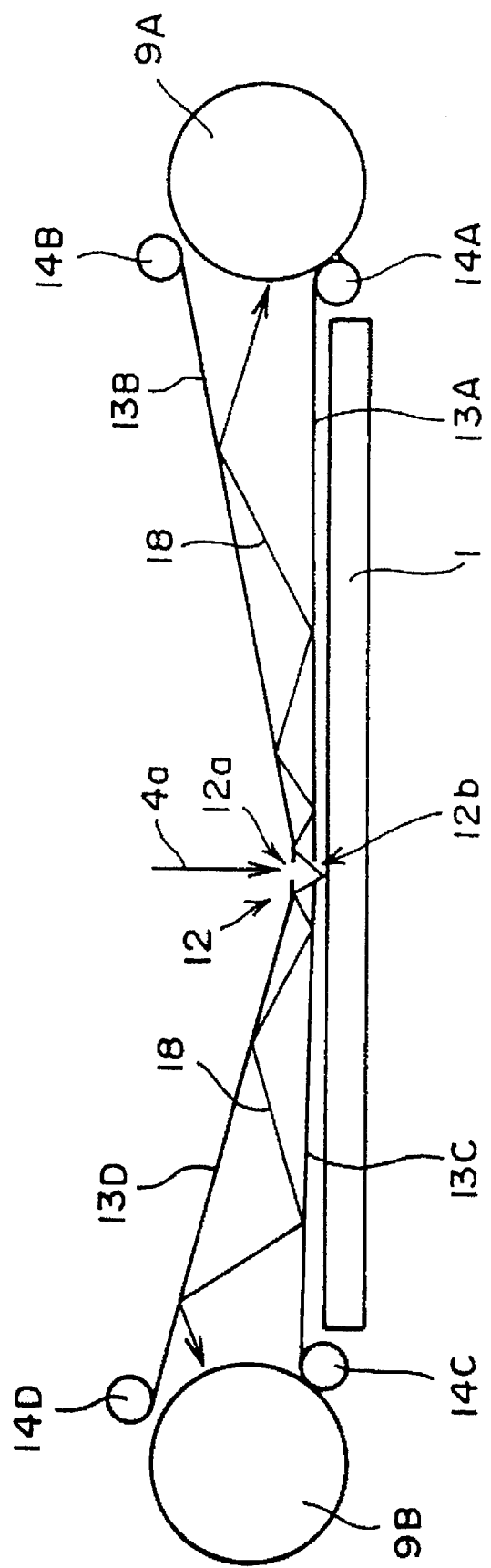
FIG. 3 is a typical sectional view of aspect portions of the embodiment shown in FIG. 1.
Figure 4:
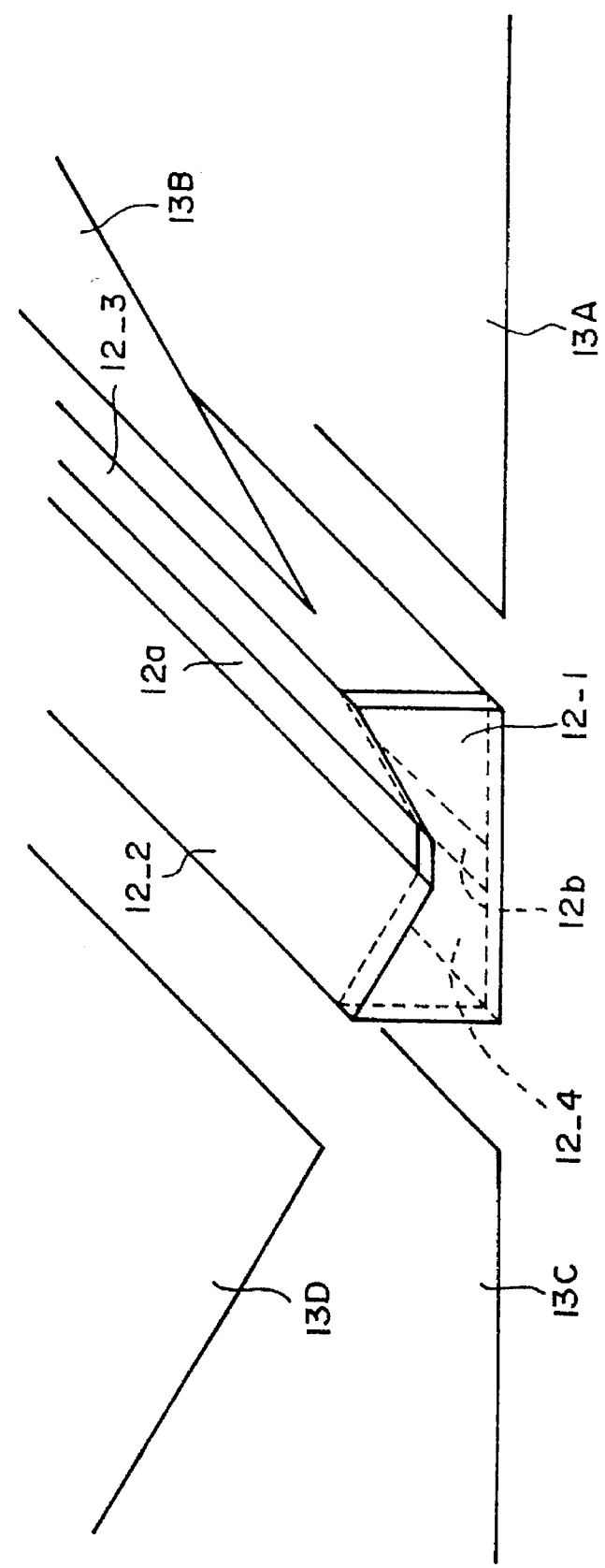
FIG. 4 is an enlarged view of a slit member shown in FIG. 1 and its neighbor.
Figure 5:
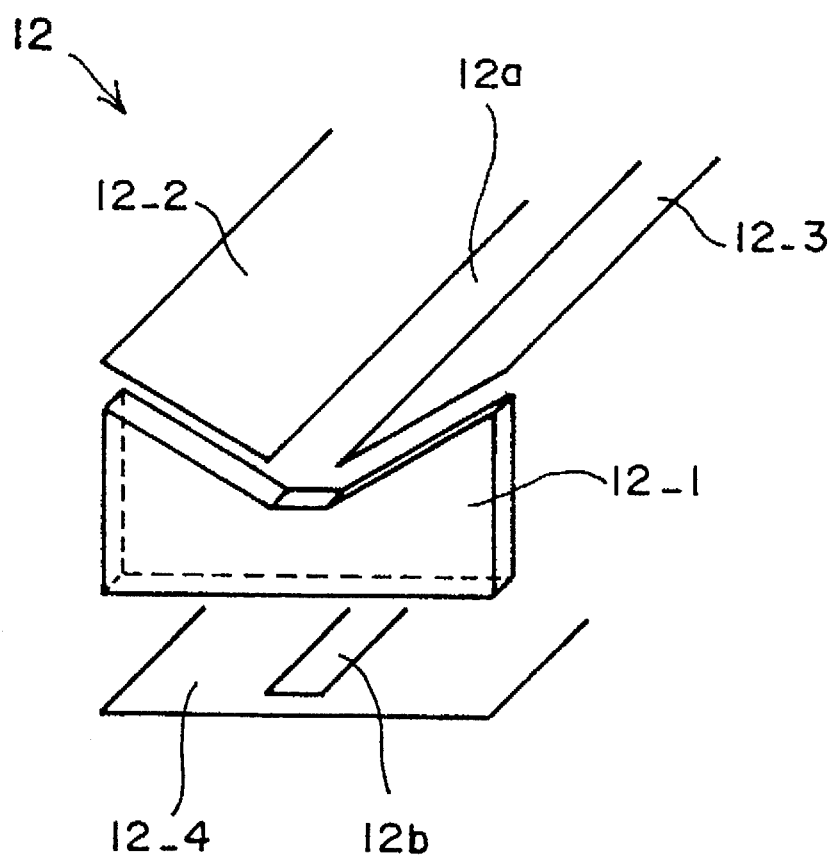
FIG. 5 is an exploded perspective view of a slit member shown in FIG. 1.

FIG. 1 is a typical schematic diagram showing an embodiment of the first radiation image reading apparatus according to the present invention. FIG. 2 is an enlarged view of aspect portions of the embodiment shown in FIG. 1. FIG. 3 is a typical sectional view of aspect portions of the embodiment shown in FIG. 1. FIG. 4 is an enlarged view of a slit member shown in FIG. 1 and its neighbor. FIG. 5 is an exploded perspective view of a slit member shown in FIG. 1.

A slab-like shaped accelerated phosphorescence fluorescent material object 1 is accommodated in a cover member (not illustrated) for the apparatus. The accelerated phosphorescence fluorescent material object 1 is irradiated with X-rays emitted from an X-ray source (not illustrated) and passing through a subject 3, so that an X-ray image of the subject 3 is accumulated and stored in the accelerated phosphorescence fluorescent material object 1.

The reverse side of the accelerated phosphorescence fluorescent material object 1 is provided with a light receiving system which is arranged as follows. At both the ends of the accelerated phosphorescence fluorescent material object 1 with respect to a sub-scan direction (up and down direction in FIG. 1), photomultipliers 9A and 9B are disposed, respectively and fixed on the cover member of the apparatus. Further, there is provided a slit member 12 which extends along the reverse side of the accelerated phosphorescence fluorescent material object 1 in a main scan. The slit member 12 is movable in the sub-scan direction. Between the slit member 12 and the photomultipliers 9A and 9B, there are spread pairs of sheets 13A, 13B; and 13C, 13D, respectively. The edges of these sheets 13A, 13B, 13C and 13D at the slit member 12 side are fixed on the slit member 12. The opposite edges of these sheets are wound by take-up rollers 14A, 14B, 14C and 14D, respectively. At the both sides of the sheets 13A, 13B, 13C and 13D, there are provided side plates 17A and 17B each for preventing leakage of the accelerated phosphorescence fluorescent light which travels between the sheets 13A and 13B; and 13C and 13D. Details of the receiving system will be described later.

The radiation image reading apparatus shown in FIG. 1 is provided with a scan unit 16. The scan unit 16 comprises a laser light source 4, a reflecting and deflecting mirror 15 for repeatedly reflecting and deflecting laser beam 4a emitted from the laser light source 4, and an fθ lens. The scan unit 16 is arranged to be movable in one united body in arrow X and Y directions. Throughout the "reading", the accelerated phosphorescence fluorescent material object 1 is repeatedly scanned in the main scan direction with the laser beam 4a emitted from the scan unit 16 through a slit formed on the slit member 12.

The slit member 12 comprises, as shown in FIG. 5, end plates 12_1 (not illustrated one existing at the opposite end), two upper plates 12_2 and 12_3 arranged to form a first slit 12a therebetween, and a bottom plate 12_4 on which a second slit 12b is formed.

The sheets 13A, 13B, 13C and 13D are fixed, as shown in FIG. 4, on the bottom plate 12_4, the upper plate 12_3, the upper plate 12_2 and the bottom plate 12_4, respectively.

The laser beam 4a emitted from the scan unit 16 is applied, as shown in FIG. 3, through the first slit 12a formed on the slit member 12 and then the second slit 12b to the accelerated phosphorescence fluorescent material object 1. Accelerated phosphorescence fluorescent light 18, which is emanated from the accelerated phosphorescence fluorescent material object 1 through irradiation with the laser beam 4a, reaches the photomultipliers 9A and 9B while being reflected repeatedly between the sheets 13A and 13B; and the sheets 13C and 13D, respectively. While it is not illustrated, the photomultipliers 9A and 9B have each at the front of their light receiving surface an optical filter adapted for permitting the accelerated phosphorescence fluorescent light to transmit while inhibiting the laser beam 4a from being transmitted.

The slit member 12 may move in the main scan direction in accordance with a movement of the scan unit 16 shown in FIG. 1 in the X-Y direction (the main scan direction) so that the laser beam 4a emitted from the scan unit 16 may always passes through the slits 12a and 12b. The sheets 13A and 13B; and the sheets 13C and 13D are controlled in sending out from the take-up rollers 14A and 14B; and take-up rollers 14C and 14D and in take-up into the same in such a manner that the sheets 13A and 13B; and the sheets 13C and 13D are spread between the slit 12 and the photomultiplier 9A; and the slit 12 and the photomultiplier 9B, respectively.

The accelerated phosphorescence fluorescent light is received by two photomultipliers 9A and 9B so as to be converted into electric signals. As shown in FIG. 2, the electric signals are applied to a signal adder 18 so as to be added to each other. The added signal as an output of the adder 18 is applied to an amplifier 10 so as to be amplified to the signal level optimum for an A/D conversion by an A/D converter 11. The amplified signal is fed to the A/D converter 11 so as to be converted into a digital signal. The digital signal thus obtained through the A/D converter 11 is temporarily stored in an image memory 19. Image data read out from the image memory 19 is fed to an image processing apparatus (not illustrated) to practice a suitable image processing. The image data subjected to the image processing is fed to an image display device (not illustrated) so that an X-ray image of the subject is reproduced and displayed.

According to the present embodiment arranged as mentioned above, the photomultipliers 9A and 9B are fixed. Consequently, it is possible throughout the reading to prevent contamination by noises due to movement and/or vibration of the photomultipliers to the electric signal.

Further, in comparison with the conventional apparatus in which the photomultipliers are fixed while the accelerated phosphorescence fluorescent material object is moved, the apparatus according to the embodiment of present invention as mentioned above needs no large dead space which is necessary for a movement of the accelerated phosphorescence fluorescent material object. Thus, according to the present embodiment, it is possible to reduce the size of the apparatus.

Figure 6:
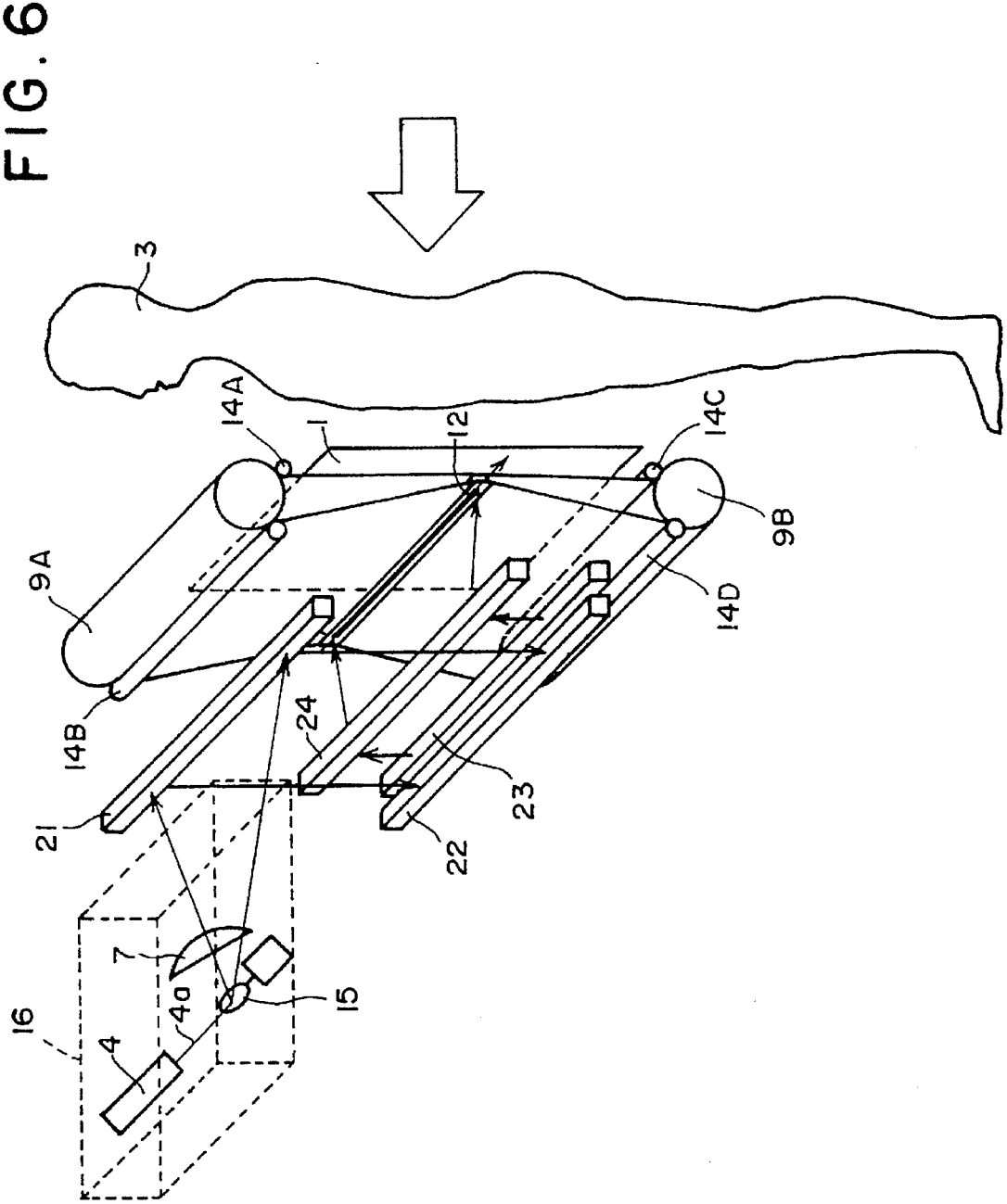
FIG. 6 is a typical schematic diagram showing another embodiment of the first radiation image reading apparatus according to the present invention.
Figure 7:
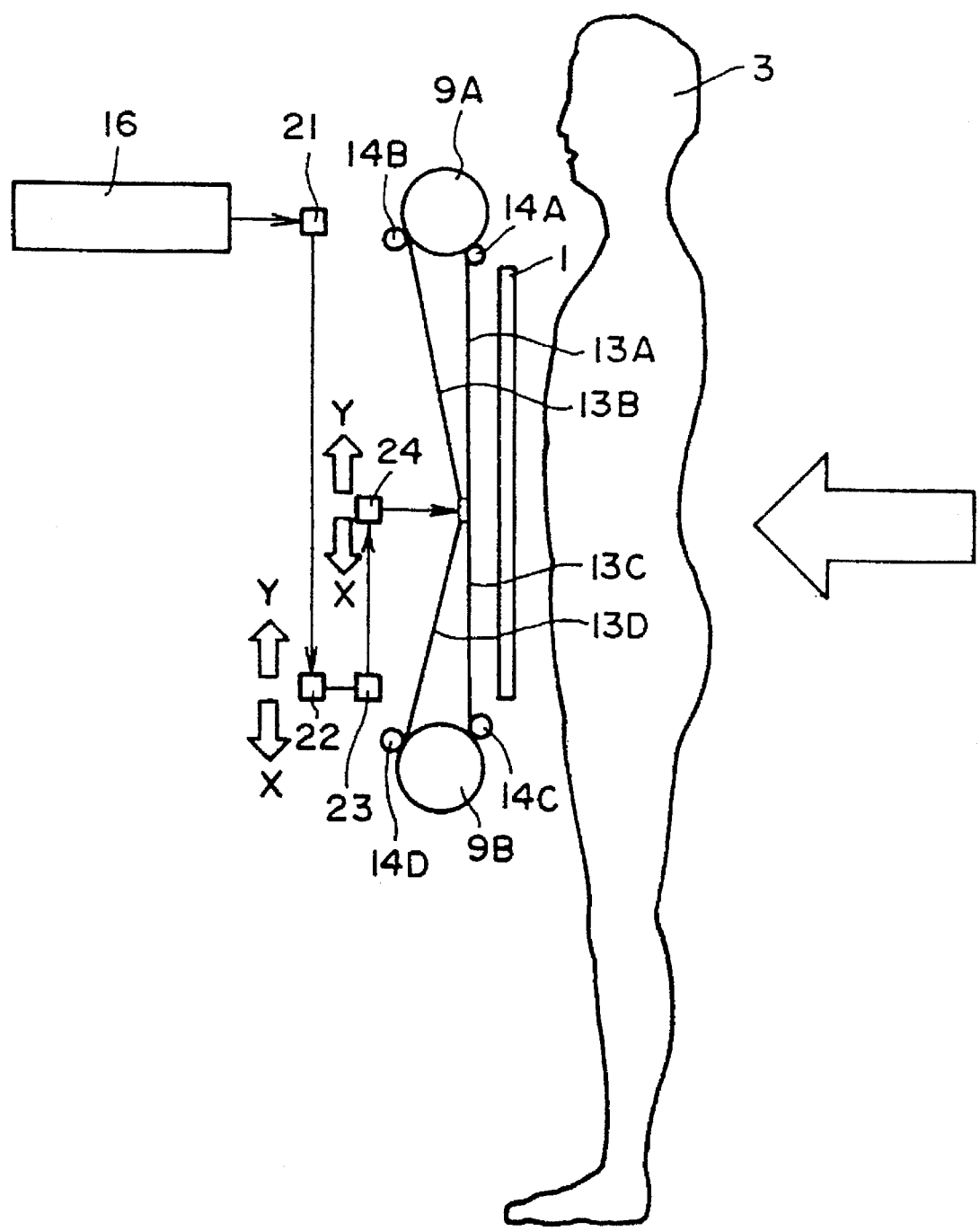
FIG. 7 is a typical sectional view of the embodiment shown in FIG. 6.

FIG. 6 is a typical schematic diagram showing another embodiment of the first radiation image reading apparatus according to the present invention. FIG. 7 is a typical sectional view of the embodiment shown in FIG. 6. In FIGS. 6 and 7, the same parts are denoted by the same reference numbers as those of FIGS. 1 to 5. And the redundant description will be omitted. Incidentally, in FIGS. 6 and 7, the side plates for closing the sides of the sheets 13A and 13B; and the sheets 13C and 13D are omitted in illustration.

According to the present embodiment, the scan unit 16 is fixed on a cover member (not illustrated) for the apparatus. On the other hand, there is provided an optical system for controlling an optical path. The optical system comprises reflection mirrors 21, 22, 23 and 24. The laser beam 4a emitted from the scan unit 16 is reflected by the reflection mirror 21 downward FIG. 6 (in a direction toward the reflection mirror 22); by the reflection mirror 22 in a direction toward the reflection mirror 23; by the reflection mirror 23 in a direction toward the reflection mirror 24; and by the reflection mirror 24 in a direction toward the accelerated phosphorescence fluorescent material object 1. The laser beam 4a, which is reflected by the reflection mirror 24 in the direction toward the accelerated phosphorescence fluorescent material object 1, is applied through the first slit 12a and the second slit 12b formed on the slit member 12 (FIGS. 3 to 5) to the accelerated phosphorescence fluorescent material object 1.

Among the reflection mirrors 21, 22, 23 and 24, the reflection mirror 21 is fixed on the cover member (not illustrated) for the apparatus. The reflection mirrors 22 and 23 move in one united body in the directions of arrows X and Y. The reflection mirror 24 also moves in the directions of arrows X and Y. Specifically, the reflection mirror 24 moves together with the slit member 12 with the same traveling speed as the slit member 12, and the reflection mirrors 22 and 23 move in the same direction as the traveling direction of the reflection mirror 24 at the speed of one half of that of the reflection mirror 24. Such a movement of the reflection mirrors 22 and 23 may always keep a constant length of the optical path between the scan unit 16 (or the laser light source 4) and the slit member 12.

In case of the present embodiment, in a similar fashion to that of the aforementioned embodiment (FIG. 1), the photomultipliers 9A and 9B are fixed. Consequently, it is possible to prevent occurrence of noises due to movement and/or vibration of the photomultipliers. In addition, since the scan unit 16, which will occupy a large volume, is also fixed, a small dead space needed for the reading can be used. This may contribute to further miniaturization of the apparatus.

Figure 8:
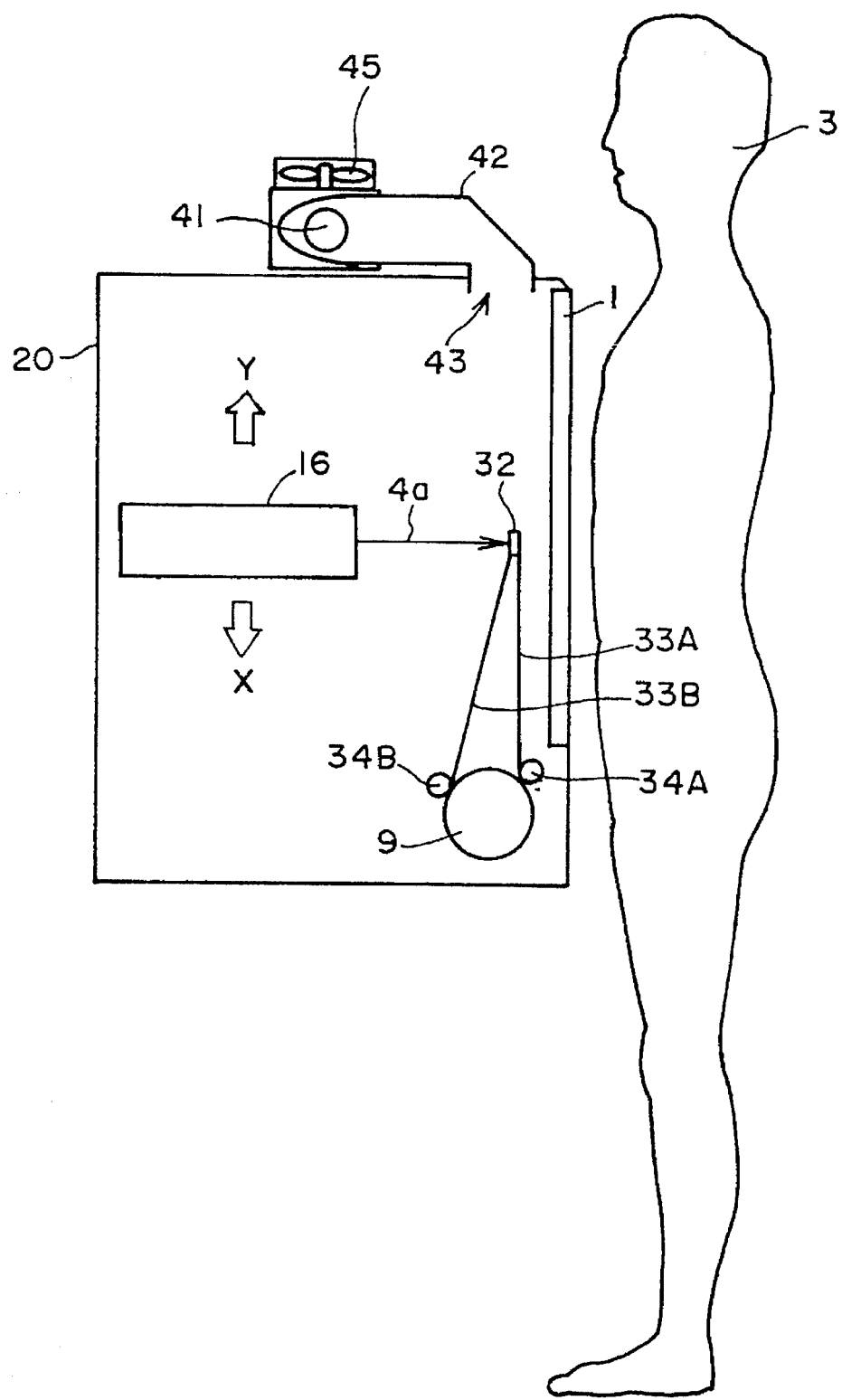
FIG. 8 is a typical schematic diagram showing further another embodiment of the first radiation image reading apparatus according to the present invention.
Figure 9:
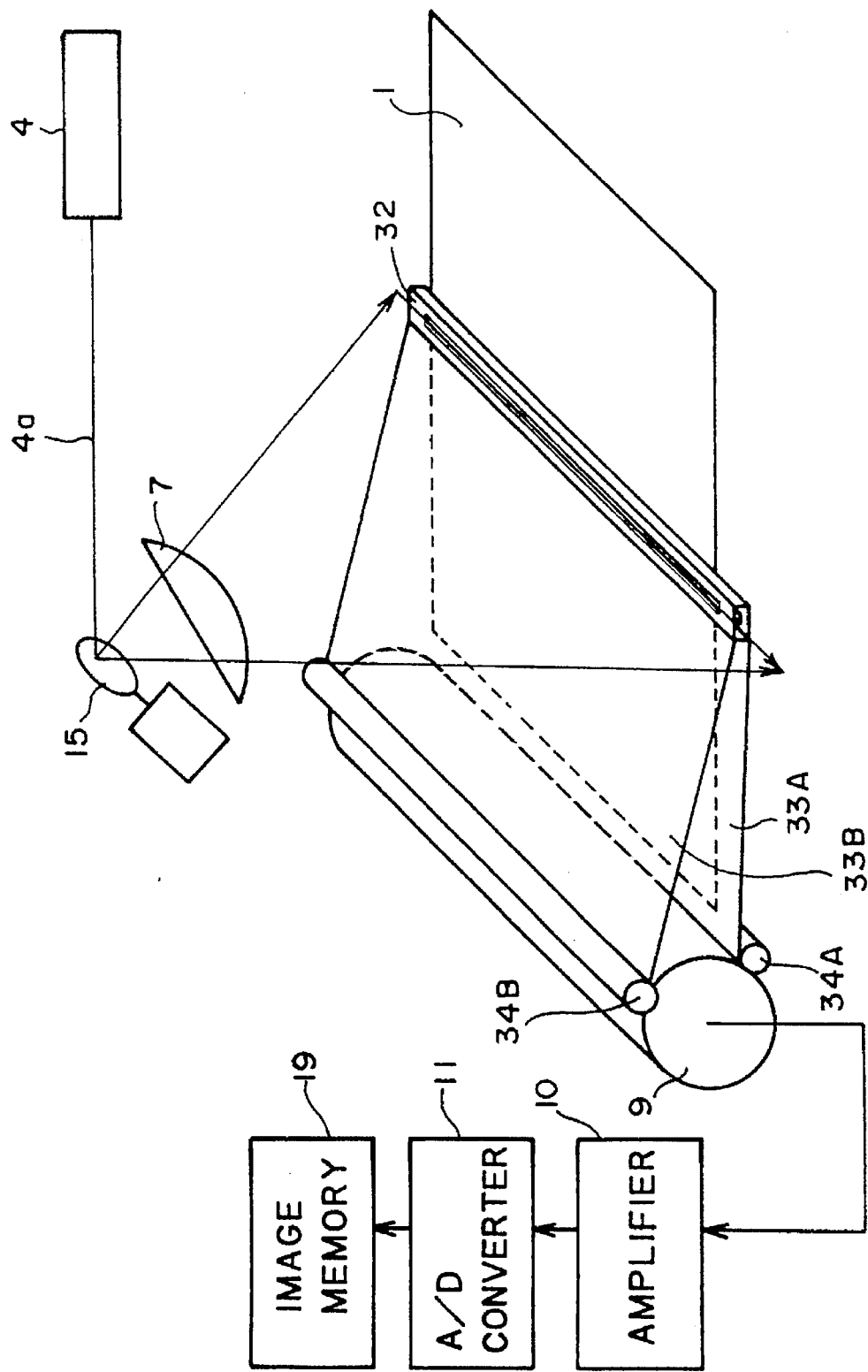
FIG. 9 is an enlarged view of aspect portions of the embodiment shown in FIG. 8.
Figure 10:
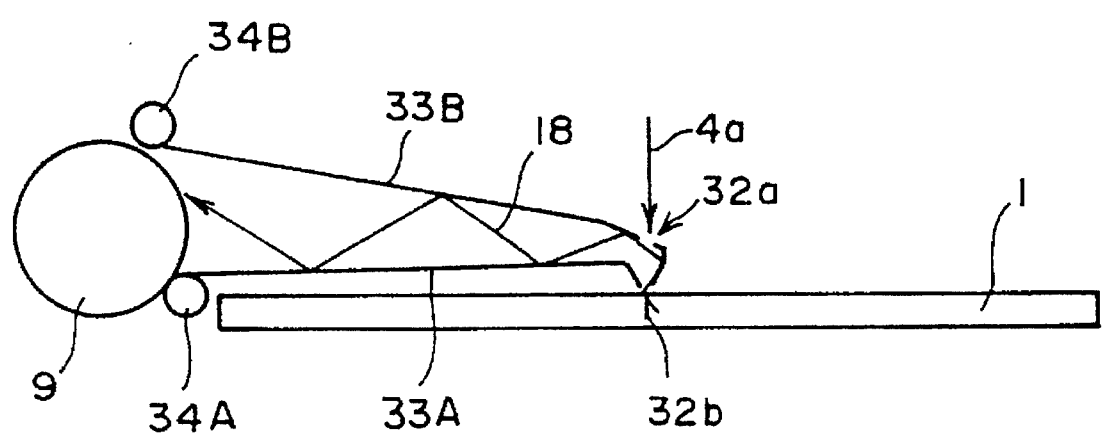
FIG. 10 is a typical sectional view of aspect portions of the embodiment shown in FIG. 8.
Figure 11:
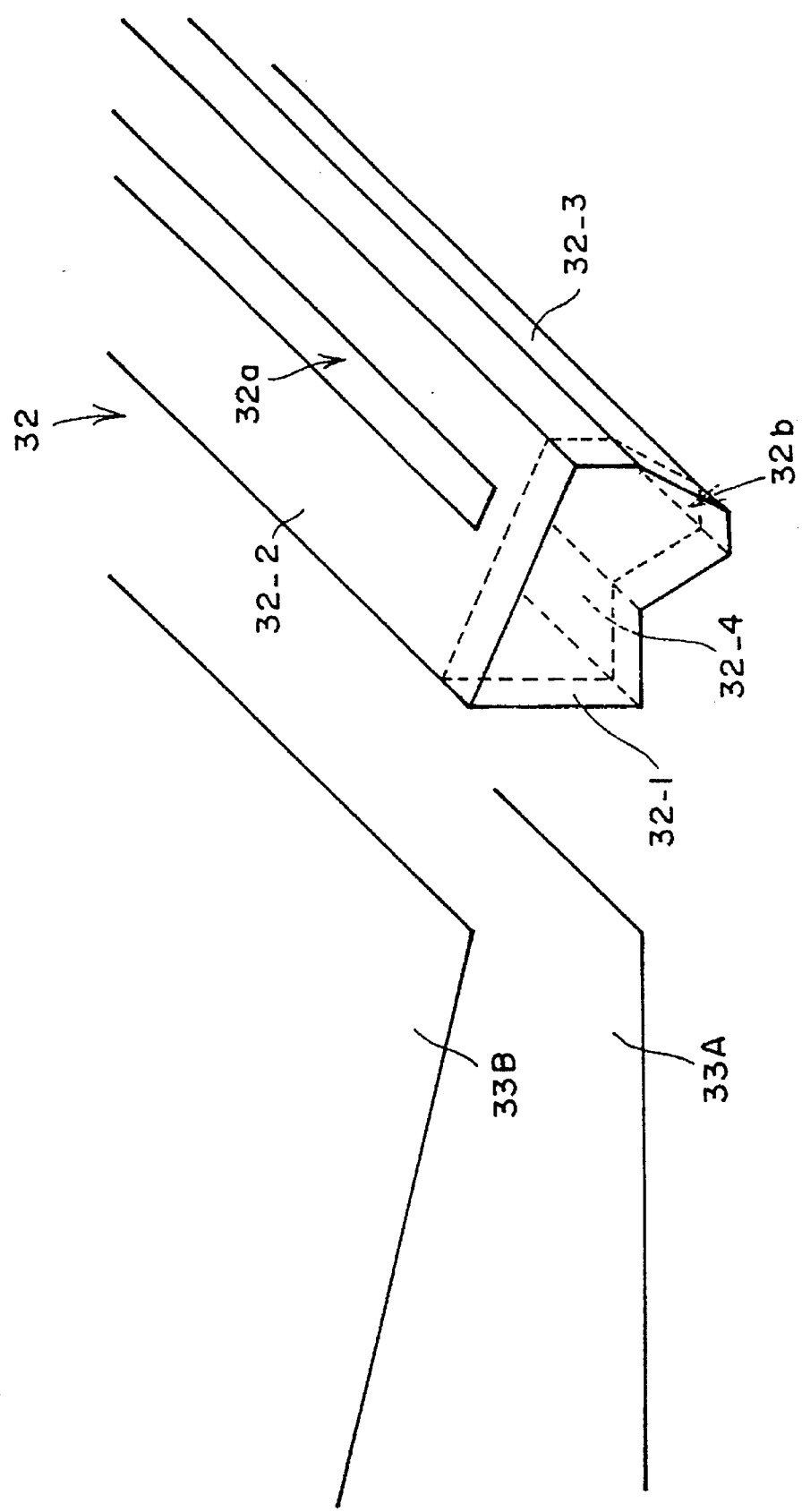
FIG. 11 is an enlarged view of a slit member shown in FIG. 8 and its neighbor.
Figure 12:
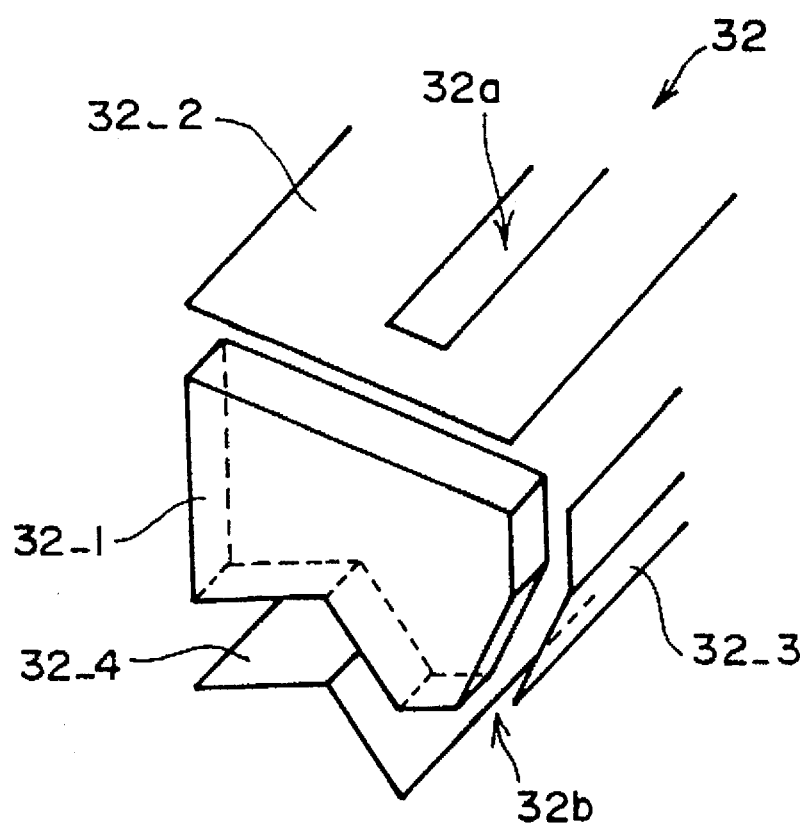
FIG. 12 is an exploded perspective view of a slit member shown in FIG. 8.

FIG. 8 is a typical schematic diagram showing further another embodiment of the first radiation image reading apparatus according to the present invention. FIG. 9 is an enlarged view of aspect portions of the embodiment shown in FIG. 8. FIG. 10 is a typical sectional view of aspect portions of the embodiment shown in FIG. 8. FIG. 11 is an enlarged view of a slit member shown in FIG. 8 and its neighbor. FIG. 12 is an exploded perspective view of a slit member shown in FIG. 8.

In FIGS. 8 to 12, the same parts are denoted by the same reference numbers as those of FIGS. 1 to 7. And the redundant description will be omitted.

The slab-like shaped accelerated phosphorescence fluorescent material object 1 is fixed at the photographic section side of a cover member 20 for the apparatus. The laser beam 4a emitted from the scan unit 16 is applied through a slit member 32 to the accelerated phosphorescence fluorescent material object 1. Accelerated phosphorescence fluorescent light emanated from the accelerated phosphorescence fluorescent material object 1 is applied passing through between two sheets 33A and 33B to a photoelectric converter 9. The scan unit 16 moves in the directions (sub-scan direction) of arrows X and Y, while the main scan by the laser beam 4a is repeatedly performed in the main scan direction (direction vertical to the sheet surface of FIG. 8). At that time, a slit member 32 is also moved in %he directions of arrows X and Y at the same time as the scan unit 16. As the slit member 32 moves, the sheets 33A and 33B are sent out from take-up rollers 34A and 34B, respectively, or taken-up on the take-up rollers 34A and 34B, respectively. With respect to the light receiving system, the difference of the present embodiment with the aforementioned two embodiments (FIGS. 1 and 6) is such a point that the sheets 33A and 33B are fixed on only one side of the slit member 32 and only one photomultipliers is provided. Details of the light receiving system will be described later.

According to the embodiment as shown in FIG. 8, there is provided a tungsten halogen lamp 41 as the erasing light source outside the apparatus cover member 20. The halogen lamp 41 is extended in the direction vertical to the sheet surface of FIG. 8. For the "erasing", erasing light emanated from the halogen lamp 41 is reflected inside a lamp cover member 42, and is applied through an aperture 43 provided on the apparatus cover member 20 to the inside of the apparatus cover member 20. The lamp cover member 42 is equipped with a fan 45 to dissipate the heat due to the light emission of the halogen lamp 41. Details of the "erasing" using the halogen lamp 41 will be described later.

The slit member 32 comprises, as shown in FIG. 12, end plates 32_1 (not illustrated one existing at the opposite end), an upper plate 32_2 having a first slit 32a, a side plate 32_3 serving to board up one side of the slit member 32, and a bottom plate 32_4 serving to close up the bottom of the slit member 32. There is formed a second slit 32b between the side plate 32_3 and the bottom plate 32_4.

The sheets 33A and 33B are fixed, as shown in FIG. 11, on the bottom plate 32_4 and the upper plate 32_2, respectively.

The laser beam 4a emitted from the scan unit 16 is applied, as shown in FIG. 10, through the first slit 32a formed on the slit member 32 and then the second slit 32b to the accelerated phosphorescence fluorescent material object 1. Accelerated phosphorescence fluorescent light 18, which is emanated from the accelerated phosphorescence fluorescent material object 1 through irradiation with the laser beam 4a, reaches the photomultiplier 9 through an optical filter (not illustrated) while being reflected repeatedly between the sheets 33A and 33B.

As shown in FIG. 9, the electric signal outputted from the photomultiplier 9 is applied to an amplifier 10 so as to be amplified to the signal level optimum for an A/D conversion by an A/D converter 11. The amplified signal is fed to the A/D converter 11 so as to be converted into a digital signal. The digital signal thus obtained through the A/D converter 11 is temporarily stored in an image memory 19. Image data read out from the image memory 19 is fed to an image processing apparatus (not illustrated) to practice a suitable image processing. The image data subjected to the image processing is fed to an image display device (not illustrated) so that an X-ray image of the subject is reproduced and displayed.

Figure 13:
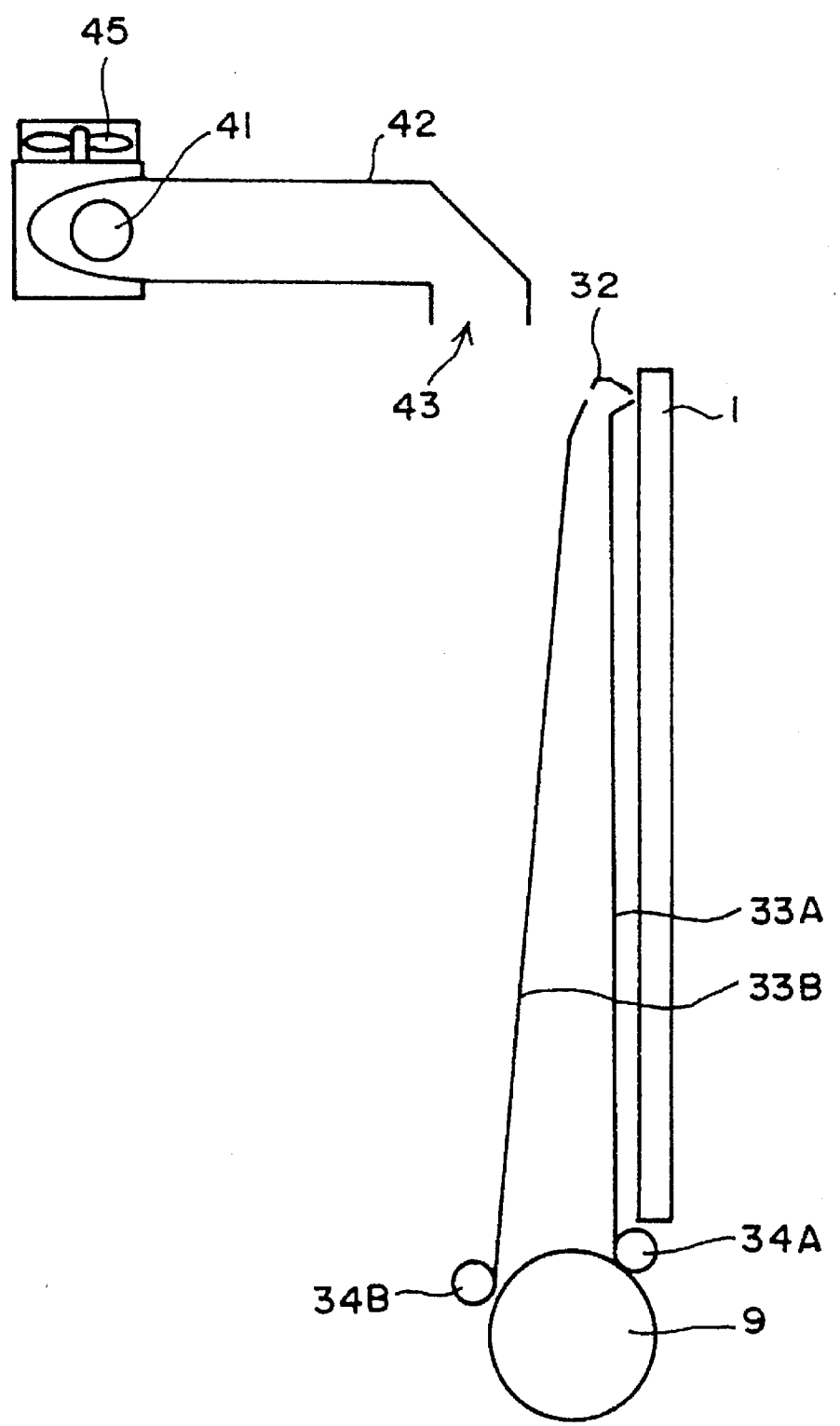
FIG. 13 is a view showing a state in which the slit member is moved to the topmost portion of the accelerated phosphorescence fluorescent material object, in connection with the embodiment shown in FIG. 8 to FIG. 12.
Figure 14:
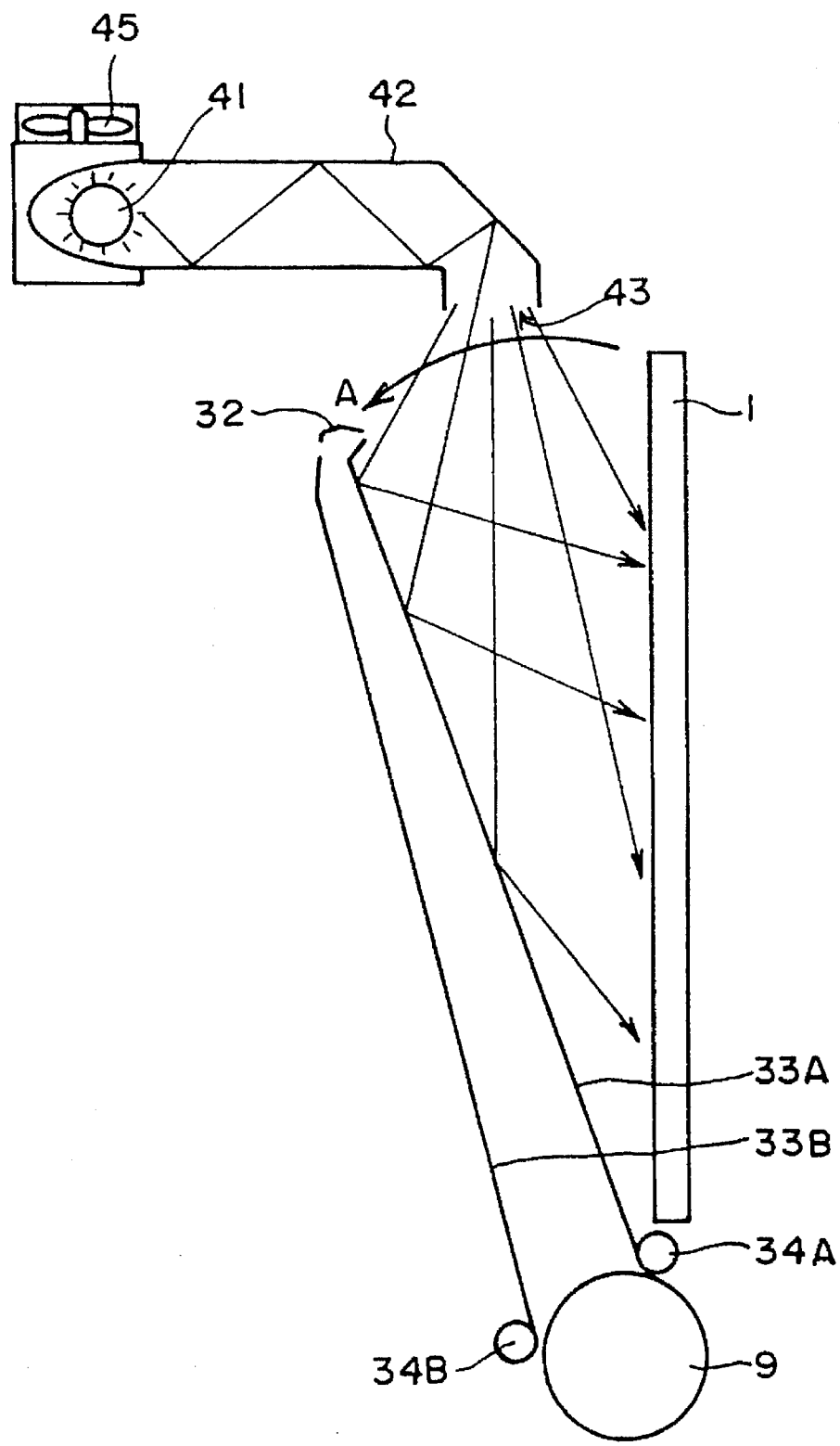
FIG. 14 is a view showing a state in which the slit member and a sheet are moved for "erasing" from the state shown in FIG. 13.

FIG. 13 is a view showing a state in which the slit member is moved to the topmost portion of the accelerated phosphorescence fluorescent material object, in connection with the embodiment shown in FIG. 8 to FIG. 12. FIG. 14 is a view showing a state in which the slit member and a sheet are moved for "erasing" from the state shown in FIG. 13.

When the erasing is performed, as shown in FIG. 13, the slit member 32 moves to the topmost portion of the accelerated phosphorescence fluorescent material object 1, and further moves in a direction of arrow A shown in FIG. 14. When the halogen lamp 41 turns on, erasing light emanated from the halogen lamp 41 is reflected inside the lamp cover member 42 and enter the inside of the apparatus cover member 20 (FIG. 8) from the aperture 43, and is reflected outside the sheet 33A to irradiate the accelerated phosphorescence fluorescent material object 1 in its entirety.

Such an arrangement of the erasing means permits to use a small dead space needed for the erasing. This may contribute to miniaturization of the apparatus.

Figure 15:
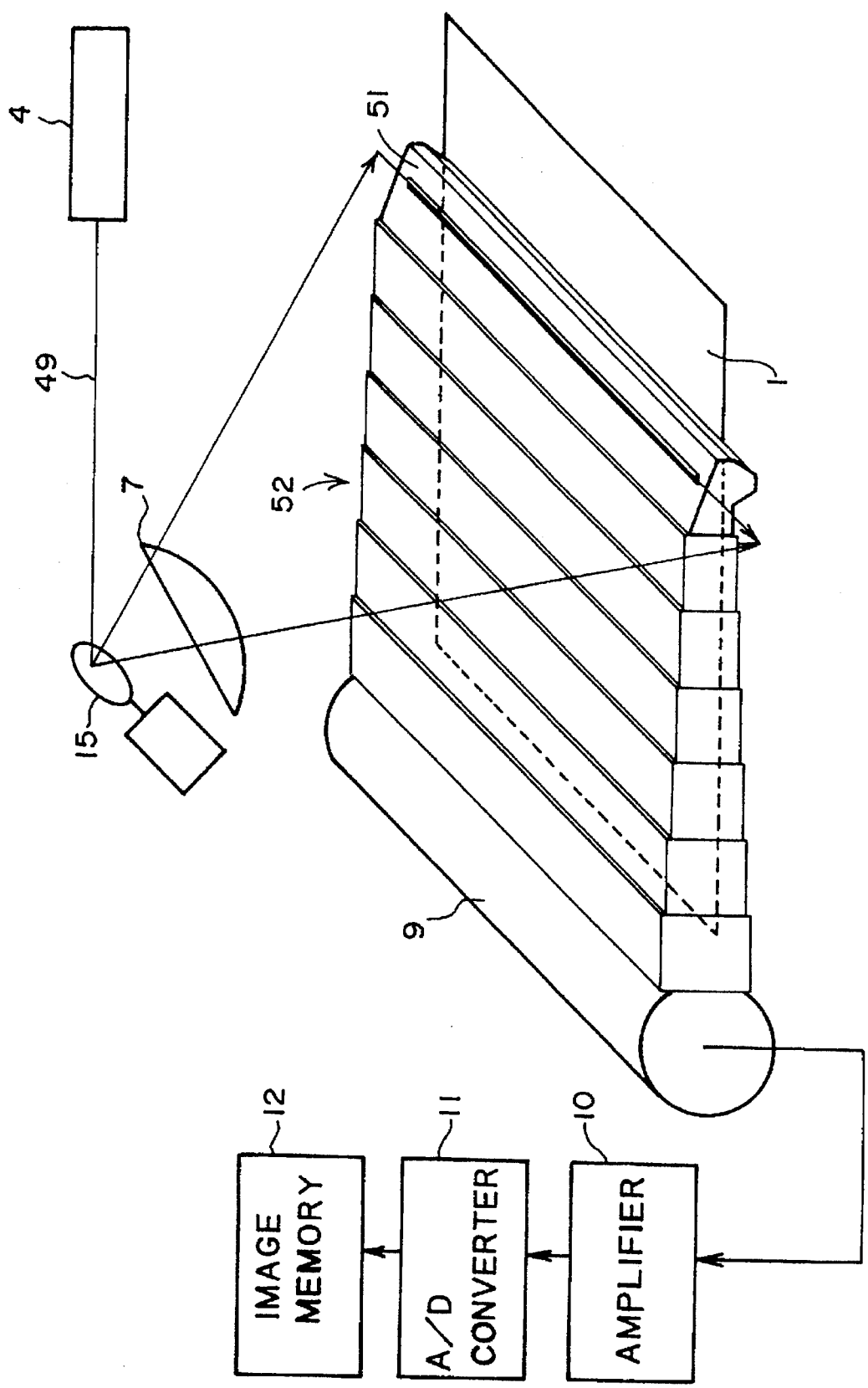
FIG. 15 is a typical illustration showing the basic arrangement of constituents of the still further another embodiment of the first radiation image reading apparatus according to the present invention.
Figure 16:
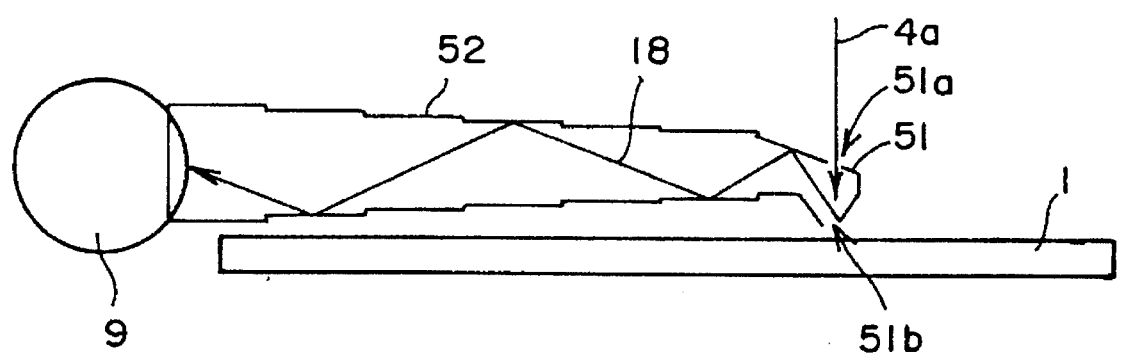
FIG. 16 is a typical sectional view of the main constituents of the embodiment shown in FIG. 15.

FIG. 15 is a typical illustration showing the basic arrangement of constituents of still further another embodiment of the first radiation image reading apparatus according to the present invention. FIG. 16 is a typical sectional view of the main constituents of the embodiment shown in FIG. 15.

A slit member 51 has a similar structure to FIGS. 11 and 12. A light guide member 52, which comprises a multi-stage of hollow boxes, is disposed between the slit 51 and the photomultiplier 9. The multi-stage of hollow boxes constituting the light guide member 52 are arranged in such a fashion that the hollow boxes can be each sequentially accommodated in the larger adjacent one. The light guide member 52 has a variable guide length chargeable between the slit 51 and the photomultiplier 9 in accordance with a movement of the slit 51 along the accelerated phosphorescence fluorescent material object 1.

The laser beam 4a emitted from the laser light source 4 is applied, as shown in FIG. 16, through the first slit 51a and the second slit 52b on the slit member 51 to the accelerated phosphorescence fluorescent material object 1. Accelerated phosphorescence fluorescent light 18, which is emanated from the accelerated phosphorescence fluorescent material object 1, enters the inside of the slit 51 through the second slit 51b and reaches the photomultiplier 9 while being reflected inside the light guide member 52.

As apparent from the present embodiment described above, with respect to the light guide member referred to in the present invention, there is no need to always adopt a sheet-like shaped one.

Figure 17:
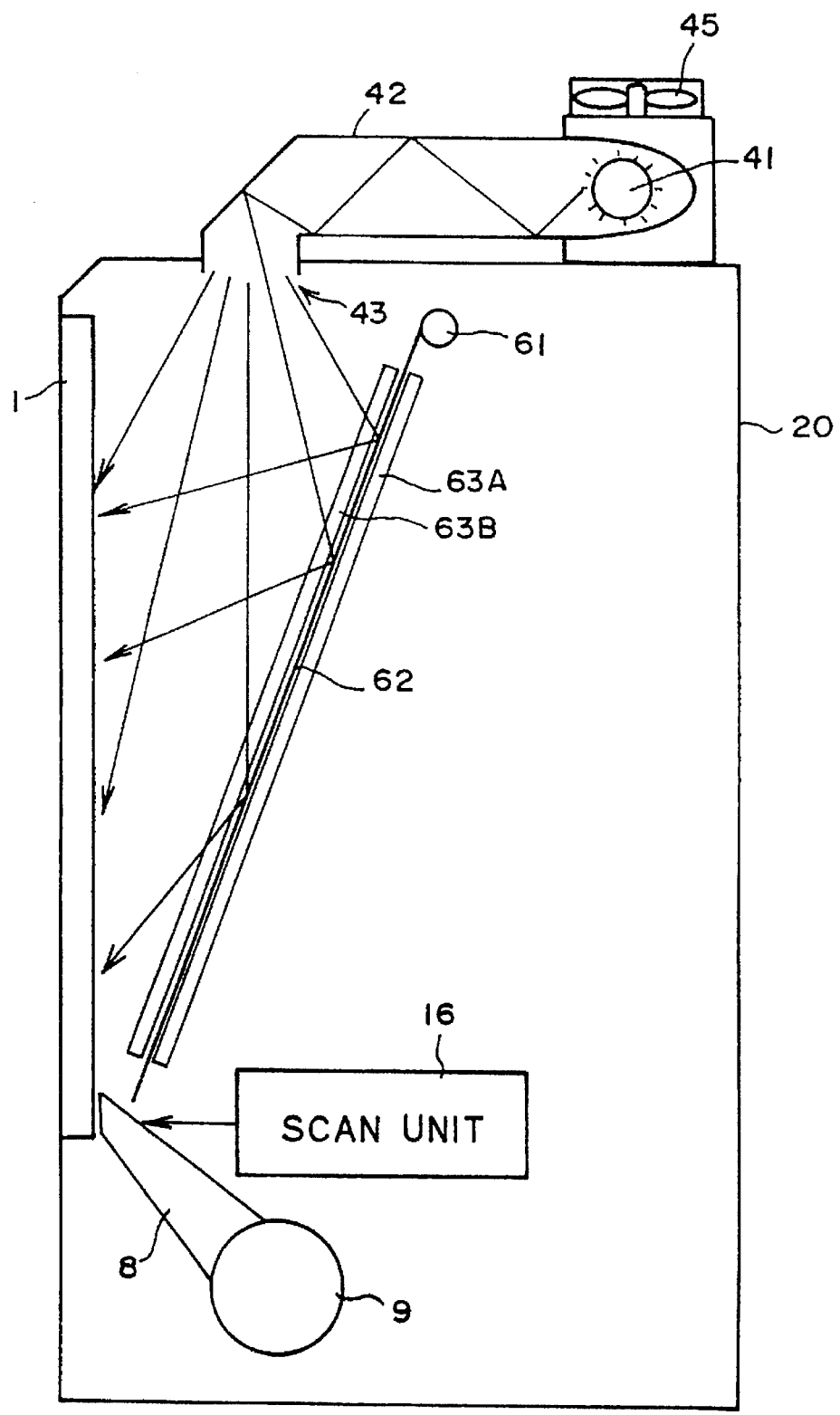
FIG. 17 is a typical schematic diagram showing an embodiment of the second radiation image reading apparatus according to the present invention.
Figure 18:
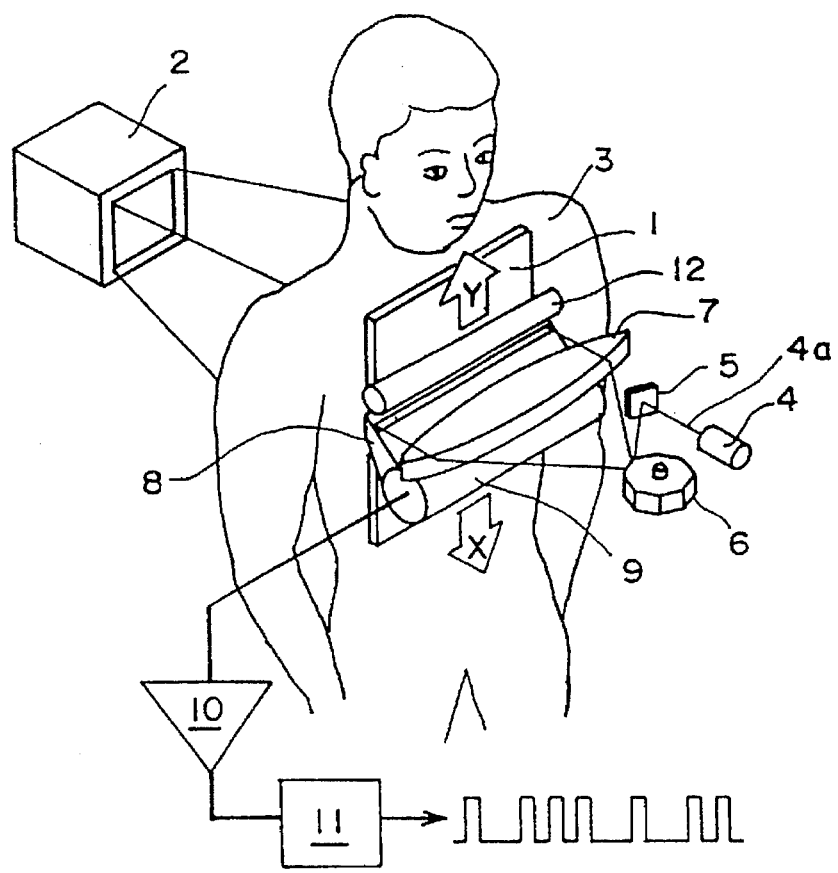
FIG. 18 is an illustration showing the basic arrangement of constituents of a radiation image reading apparatus using an accelerated phosphorescence fluorescent material.
Figure 19:
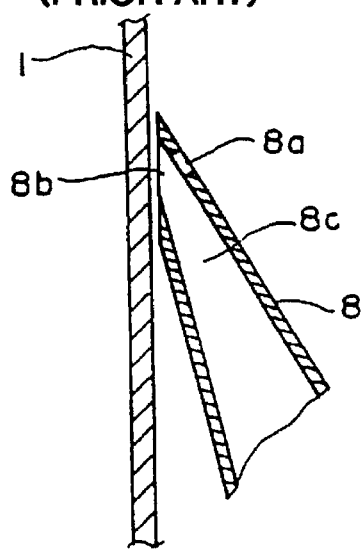
FIG. 19 is a sectional view of a substage condenser which is used in the radiation image reading apparatus as shown in FIG. 18.
Figure 20:
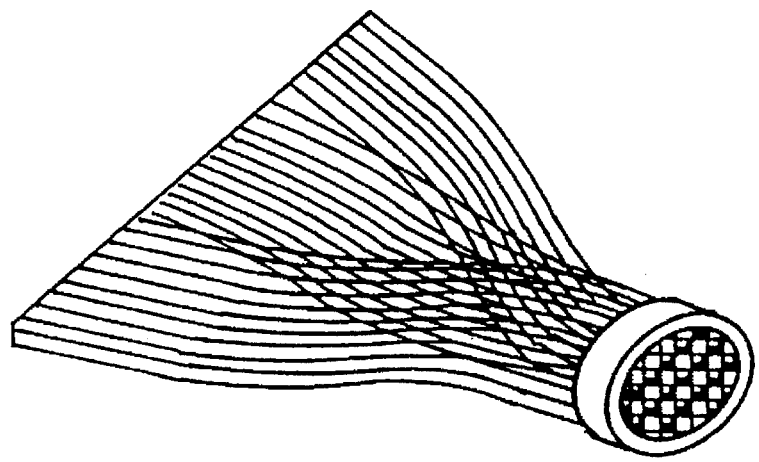
FIGS. 20 is a view showing by way of example a substage condenser which is different in type from the substage condenser shown in FIG. 19.
Figure 21:
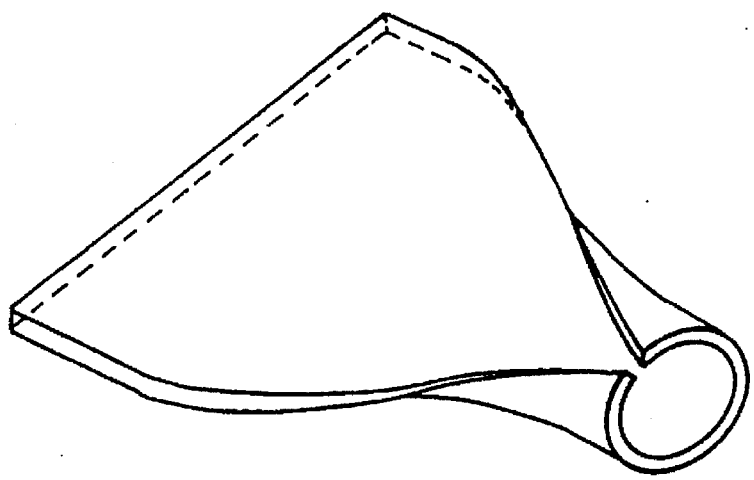
FIG. 21 is a view showing further by way of example a substage condenser which is different in type from the substage condenser shown in FIG. 19.

FIG. 17 is a typical schematic diagram showing an embodiment of the second radiation image reading apparatus according to the present invention.

A reflection sheet 62 is taken-up on a take-up roller 61 on a developable basis. The apparatus cover member 20 is equipped with reflection sheet guides 63A and 63B for guiding both side edges of the reflection sheet 62 when it is developed, at inner walls of both sides thereof. The reflection sheet 62 may be saved not so as to disturb the reading when it is taken-up on the take-up roller 61. At the time of the erasing, the reflection sheet 62 may be developed as shown in FIG. 17 while it is guided by the reflection sheet guides 63A and 63B. When the halogen lamp 41 turns on, erasing light emanated from the halogen lamp 41 is reflected inside the lamp cover member 42 and enter the inside of the apparatus cover member 20 from the aperture 43, and is reflected by the reflection sheet 62 to irradiate the accelerated phosphorescence fluorescent material object 1 in its entirety.

Incidentally, with respect to the reflection sheet guides 63A and 63B, there is no need to always adopt a straight line-like shaped one. It is acceptable to adopt anyone which guides the reflection sheet 62 along a predetermined curve. In this case, the reflection sheet 62 will have a predetermined curved surface when it is developed. Some shape of the curved surface may serve to more efficiently reflect the erasing light toward the accelerated phosphorescence fluorescent material object 1.

Such an arrangement of the erasing means permits a very small dead space needed for the erasing. This contributes to miniaturization of the apparatus.

As described above, according to the first radiation image reading apparatus, it is possible to prevent contamination of noises due to the vibration of the photomultiplier. Further, it is possible to contribute to miniaturization of the apparatus in comparison with such a type of apparatus that the accelerated phosphorescence fluorescent material object is moved.

Further, according to the second radiation image reading apparatus, it is possible to use a very small dead space needed for the erasing, thereby contributing to miniaturization of the apparatus.

The present invention is not limited to the particular embodiments described above. Various changes and modifications may be made within the spirit and scope of the invention.

What is claimed is:

1. A radiation imaging apparatus comprising:

scan means for scanning a slab-like shaped accelerated phosphorescence fluorescent material object, onto which object image information is accumulated and stored, in a two-dimensional configuration so that the accelerated phosphorescence fluorescent material object is repeatedly scanned with excitation light in a predetermined main scan direction, while the excitation light is moved relative to the accelerated phosphorescence fluorescent material object in a sub-scan direction perpendicular to the main scan direction; and light receiving means for receiving an accelerated phosphorescence fluorescent light emanated from the accelerated phosphorescence fluorescent material object, wherein said light receiving means comprises:

a slit member having a slit extending in the main scan direction for directing the excitation light to transmit toward the accelerated phosphorescence fluorescent material object, said slit member being movable along the accelerated phosphorescence fluorescent material object in the sub-scan direction;

photoelectric converter means for receiving the accelerated phosphorescence fluorescent light, said photoelectric converter means being fixed; and light guide member means for guiding to said photoelectric converter means the accelerated phosphorescence fluorescent light emanated from the accelerated phosphorescence fluorescent material object through irradiation of the accelerated phosphorescence fluorescent material object with the excitation light entered from said slit member, said light guide member means has a variable length being extendable between said slit member and said photoelectric converter means, the length varying in accordance with a movement of said slit member in the sub-scan direction.

2. The apparatus according to claim 1, wherein said light guide member means is a sheet spreading between said slit member and said photoelectric converter means, and said light receiving means is provided with a take-up roller for taking-up said sheet in accordance with a movement of said slit member in the sub-scan direction.

3. The apparatus according to claim 2, wherein an exterior of said sheet is formed on a reflective surface which reflects erasing light, said apparatus further comprising:

an erasing light source for emitting the erasing light to erase image information remained in said accelerated phosphorescence fluorescent material object, said erasing light source being fixed; and a sheet moving mechanism for moving said sheet between a light receiving position to guide the accelerated phosphorescence fluorescent light to said photoelectric converter means and an erasing position to reflect at the exterior of said sheet the erasing light emanated from said erasing light source toward said accelerated phosphorescence fluorescent material object, in a state that the sheet is fed from said take-up roller.

4. The apparatus according to claim 1, wherein said scan means comprises:

an excitation light source for emitting excitation light, said excitation light source being fixed;

a deflection optical system for repeatedly deflecting the excitation light emitted from said excitation light source so that the accelerated phosphorescence fluorescent material object is scanned with the excitation light in the main scan direction; and an optical system adapted to control an optical path length for guiding the excitation light emitted from said excitation light source to said slit member keeping a constant length of an optical path between said excitation light source and the slit member in accordance with a movement of said slit member in the sub-scan direction.

5. A radiation image reading and erasing apparatus comprising:

scan means for scanning a slab-like shaped accelerated phosphorescence fluorescent material object, onto which object image information is accumulated and stored, on a two-dimensional configuration so that the accelerated phosphorescence fluorescent material object is repeatedly scanned with excitation light in a predetermined main scan direction, while the excitation light is moved relative to the accelerated phosphorescence fluorescent material object in a sub-scan direction perpendicular to the main scan direction;

light receiving means for receiving an accelerated phosphorescence fluorescent light emanated from the accelerated phosphorescence fluorescent material object; and erasing means for irradiating the accelerated phosphorescence fluorescent material object with erasing light to erase image information remaining in the accelerated phosphorescence fluorescent material object, wherein said erasing means comprises:

an erasing light source means for emitting the erasing light, said erasing light source means being fixed;

a reflection sheet forming part of said light receiving means, said reflection sheet being movable between an erasing position at which said reflection sheet reflects the erasing light emanated from said erasing light source toward the accelerated phosphorescence fluorescent material object and a light receiving position at which said light receiving means receives the accelerated phosphorescent light; and a take-up roller for taking-up said reflection sheet at the light receiving position.

\* \* \* \* \*